United States Patent
Tran et al.

(10) Patent No.: US 10,222,109 B2
(45) Date of Patent: Mar. 5, 2019

(54) SPACE TEMPERATURE AND DISCHARGE AIR TEMPERATURE CONTROL

(71) Applicant: Lennox Industries Inc., Richardson, TX (US)

(72) Inventors: John Tran, The Colony, TX (US); Thomas Pate, Jr., Frisco, TX (US)

(73) Assignee: Lennox Industries Inc., Richardson, TX (US)

( * ) Notice: Subject to any disclaimer, the term of this patent is extended or adjusted under 35 U.S.C. 154(b) by 332 days.

(21) Appl. No.: 15/004,376

(22) Filed: Jan. 22, 2016

(65) Prior Publication Data
US 2017/0211833 A1     Jul. 27, 2017

(51) Int. Cl.
| | |
|---|---|
| F25B 49/02 | (2006.01) |
| F24F 11/30 | (2018.01) |
| F24F 11/77 | (2018.01) |
| F24F 11/83 | (2018.01) |
| F24F 110/10 | (2018.01) |
| F24F 120/20 | (2018.01) |
| F24F 11/63 | (2018.01) |
| F24F 11/64 | (2018.01) |
| F24F 11/85 | (2018.01) |

(52) U.S. Cl.
CPC ............ *F25B 49/022* (2013.01); *F24F 11/30* (2018.01); *F24F 11/77* (2018.01); *F24F 11/83* (2018.01); *F24F 11/63* (2018.01); *F24F 11/64* (2018.01); *F24F 11/85* (2018.01); *F24F 2110/10* (2018.01); *F24F 2120/20* (2018.01); *F25B 2700/171* (2013.01); *F25B 2700/173* (2013.01); *F25B 2700/2104* (2013.01); *Y02B 30/746* (2013.01)

(58) Field of Classification Search
None
See application file for complete search history.

(56) References Cited

U.S. PATENT DOCUMENTS

| | | | |
|---|---|---|---|
| 8,011,199 B1 * | 9/2011 | Chen ...................... | F25B 49/022 62/157 |
| 2002/0008149 A1 * | 1/2002 | Riley ................... | F24F 11/0017 236/49.3 |
| 2006/0161306 A1 * | 7/2006 | Federspiel ........... | F24F 11/0012 700/276 |

(Continued)

*Primary Examiner* — Kenneth M Lo
*Assistant Examiner* — Istiaque Ahmed
(74) *Attorney, Agent, or Firm* — Baker Botts L.L.P.

(57) ABSTRACT

A temperature control method includes obtaining, by a controller, a space temperature value, a space temperature set point, a discharge air temperature value, and a discharge air temperature set point. The method further includes determining a compressor speed using a first PI loop based on the space temperature set point and the space temperature value, and determining a supply fan speed using a second PI loop based on the discharge air temperature set point and the discharge air temperature value. The temperature control method further includes outputting a first control signal that controls the speed of a variable speed compressor based on the determination of whether the compressor speed is within the compressor operation range and a second control signal to control the speed of a variable speed supply fan based on the determination of whether the supply fan speed is within the supply fan operation range.

18 Claims, 5 Drawing Sheets

(56) References Cited

U.S. PATENT DOCUMENTS

2012/0210736 A1* 8/2012 Rockenfeller ............ F25B 7/00
                                                            62/115
2015/0337831 A1* 11/2015 Zhou ...................... F24F 11/001
                                                          700/276

* cited by examiner

| DAT (°F) | COMPRESSOR SPEED (Hz) | | | |
|---|---|---|---|---|
| | 55 | | 54 | |
| 65 | 4109 | 1.00 | 4082 | 1.00 |
| 64 | 3718 | 1.00 | 3688 | 1.00 |
| 63 | 3360 | 1.00 | 3329 | 1.00 |
| 62 | 3032 | 0.98 | 3000 | 0.98 |
| 61 | 2734 | 0.92 | 2702 | 0.93 |
| 60 | 2465 | 0.88 | 2432 | 0.88 |
| 59 | 2221 | 0.84 | 2189 | 0.84 |
| 58 | 2003 | 0.80 | 1972 | 0.80 |
| 57 | 1808 | 0.77 | 1778 | 0.77 |
| 56 | 1635 | 0.75 | 1606 | 0.75 |
| 55 | 1482 | 0.72 | 1455 | 0.72 |
| 54 | 1347 | 0.70 | 1323 | 0.70 |
| 53 | 1231 | 0.69 | 1209 | 0.69 |
| 52 | 1129 | 0.67 | 1103 | 0.67 |
| 51 | 1043 | 0.66 | 1024 | 0.66 |
| 50 | 968 | 0.65 | 952 | 0.65 |
| 49 | 905 | 0.64 | 890 | 0.64 |
| 48 | 851 | 0.63 | 838 | 0.63 |
| 47 | 804 | 0.63 | 793 | 0.63 |
| 46 | 764 | 0.62 | 754 | 0.62 |
| 45 | 729 | 0.62 | 719 | 0.62 |

FIG. 4

| DAT (°F) | COMPRESSOR SPEED (Hz) | | | |
|---|---|---|---|---|
| | 26 | | 25 | |
| 65 | 2121 | 1.00 | 2009 | 1.00 |
| 64 | 1895 | 1.00 | 1797 | 1.00 |
| 63 | 1692 | 1.00 | 1606 | 1.00 |
| 62 | 1510 | 0.97 | 1436 | 0.97 |
| 61 | 1348 | 0.92 | 1284 | 0.92 |
| 60 | 1203 | 0.88 | 1148 | 0.88 |
| 59 | 1075 | 0.84 | 1027 | 0.84 |
| 58 | 960 | 0.80 | 919 | 0.80 |
| 57 | 859 | 0.77 | 823 | 0.77 |
| 56 | 759 | 0.74 | 737 | 0.74 |
| 55 | 689 | 0.72 | 661 | 0.72 |
| 54 | 619 | 0.69 | 593 | .69 |
| 53 | 557 | 0.67 | 533 | 0.67 |
| 52 | 502 | 0.66 | 479 | 0.66 |
| 51 | 454 | 0.64 | 431 | 0.64 |
| 50 | 411 | 0.63 | 389 | 0.63 |
| 49 | 373 | 0.61 | 351 | 0.61 |
| 48 | 339 | 0.60 | 316 | 0.60 |
| 47 | 309 | 0.59 | 286 | 0.59 |
| 46 | 282 | 0.58 | 269 | 0.58 |
| 45 | 257 | 0.57 | 233 | 0.57 |

*FIG. 5*

SPACE TEMPERATURE AND DISCHARGE AIR TEMPERATURE CONTROL

TECHNICAL FIELD

This disclosure relates generally to heating, ventilating, and air conditioning (HVAC) systems, and more specifically to systems and methods for controlling the discharge air temperature of an HVAC system and space air temperatures.

BACKGROUND

Heating, ventilation, and air conditioning (HVAC) systems can be used to regulate the temperature of a room or space. Existing HVAC systems use a discharge set point to control the speed of a compressor and the temperature difference between a space temperature and a space temperature set point (e.g. space temperature delta) to control the speed of a supply fan. As a result of the compressor being an important factor in controlling the capacity of a refrigeration system, existing systems put an emphasis on controlling the discharge air temperature over controlling the space temperature. The discharge air temperature can fluctuate over a much greater range than the space temperature delta, which may cause the speed of a compressor to be higher initially than what is needed to cool a space and can lead to higher energy consumption and reduced reliability. It is desirable to provide an HVAC system that improves the efficiency of regulating the temperature of a space.

SUMMARY

In one embodiment, the disclosure includes a temperature control system comprising a variable speed compressor, a variable speed supply fan, a room temperature sensor, a discharge air temperature sensor, a compressor controller, a supply fan controller, and a system controller. The room temperature sensor is configured to measure a space temperature value. The discharge air temperature sensor is configured to measure a discharge air temperature value.

The compressor controller is operably coupled to the room temperature sensor and is configured to receive a space temperature set point, to receive the space temperature value from the room temperature sensor, to determine a compressor speed based on a delta between the space temperature set point and the space temperature value using a first proportional-integral (PI) loop, and to output the determined compressor speed.

The supply fan controller is operably coupled to the discharge air temperature sensor and is configured to receive a discharge air temperature set point, to receive the discharge air temperature value from the discharge air temperature set point, to determine a supply fan speed based on a delta between the discharge air temperature set point and the discharge air temperature value using a second PI loop, and to output the determined supply fan speed.

The system controller is operably coupled to the variable speed compressor, the variable speed supply fan, the compressor controller, and the supply fan controller and is configured to receive the determined compressor speed from the compressor controller and the determined supply fan speed from the supply fan controller. The system controller is configured to determine whether the determined compressor speed is within a compressor operation range and to output a first control signal that controls the speed of the variable speed compressor based on the determination whether the determined compressor speed is within a compressor operation range. The system controller is also configured to determine whether the determined supply fan speed is within a supply fan operation range and to transmit a second control signal that controls the speed of the variable speed supply fan based on the determination whether the determined supply fan speed is within a supply fan operation range.

In another embodiment, the disclosure includes a temperature control method comprising obtaining, by a controller, a space temperature value from a room temperature sensor and a space temperature set point and determining, by the controller, a compressor speed using a first PI loop based on a delta between the space temperature set point and the space temperature value. The temperature control method further comprises obtaining, by the controller, a discharge air temperature value from a discharge air temperature sensor and a discharge air temperature set point and determining, by the controller, a supply fan speed using a second PI loop based on a delta between the discharge air temperature set point and the discharge air temperature value.

The temperature control method further comprises determining, by the controller, whether the determined compressor speed is within a compressor operation range, and outputting, by the controller, a first control signal that controls the speed of a variable speed compressor based on the determination whether the determined compressor speed is within a compressor operation range. The temperature control method further comprises determining, by the controller, whether the determined supply fan speed is within a supply fan operation range, and outputting, by the controller, a second control signal to control the speed of a variable speed supply fan based on the determination whether the determined supply fan speed is within a supply fan operation range.

In yet another embodiment, the disclosure includes a device comprising a controller and a memory. The memory is operable to store a compressor operation range and a supply fan operation range. The controller is operably coupled to the memory and is configured to obtain a space temperature value from a room temperature sensor and a space temperature set point and to determine a compressor speed using a first PI loop based on a delta between the space temperature set point and the space temperature value. The controller is further configured to obtain a discharge air temperature value from a discharge air temperature sensor and a discharge air temperature set point and determine a supply fan speed using a second PI loop based on a delta between the discharge air temperature set point and the discharge air temperature value.

The controller is further configured to determine whether the determined compressor speed is within the compressor operation range and to output a first control signal that controls the speed of a variable speed compressor based on the determination whether the determined compressor speed is within a compressor operation range. The controller is further configured to determine whether the determined supply fan speed is within the supply fan operation range and output a second control signal to control the speed of a variable speed supply fan based on the determination whether the determined supply fan speed is within a supply fan operation range.

The present embodiment presents several technical advantages. Unlike existing HVAC systems, the presently disclosed HVAC system is configured to control the speed of a variable speed compressor based on a space temperature delta and to control the speed of a variable speed supply fan based on a discharge air temperature set point. Using the space temperature delta to control the speed of the variable speed compressor may reduce or avoid over ramping the initial speed of the variable speed compressor, which may improve reliability and efficiency by slowly ramping up the speed of the variable speed compressor.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a table of an embodiment of a controller employing the temperature control method when both the determined compressor speed and the supply fan speed cannot be satisfied; and FIG. 5 is a table of another embodiment of a controller employing the temperature control method when both the determined compressor speed and the supply fan speed cannot be satisfied.

DETAILED DESCRIPTION

Figure 1:
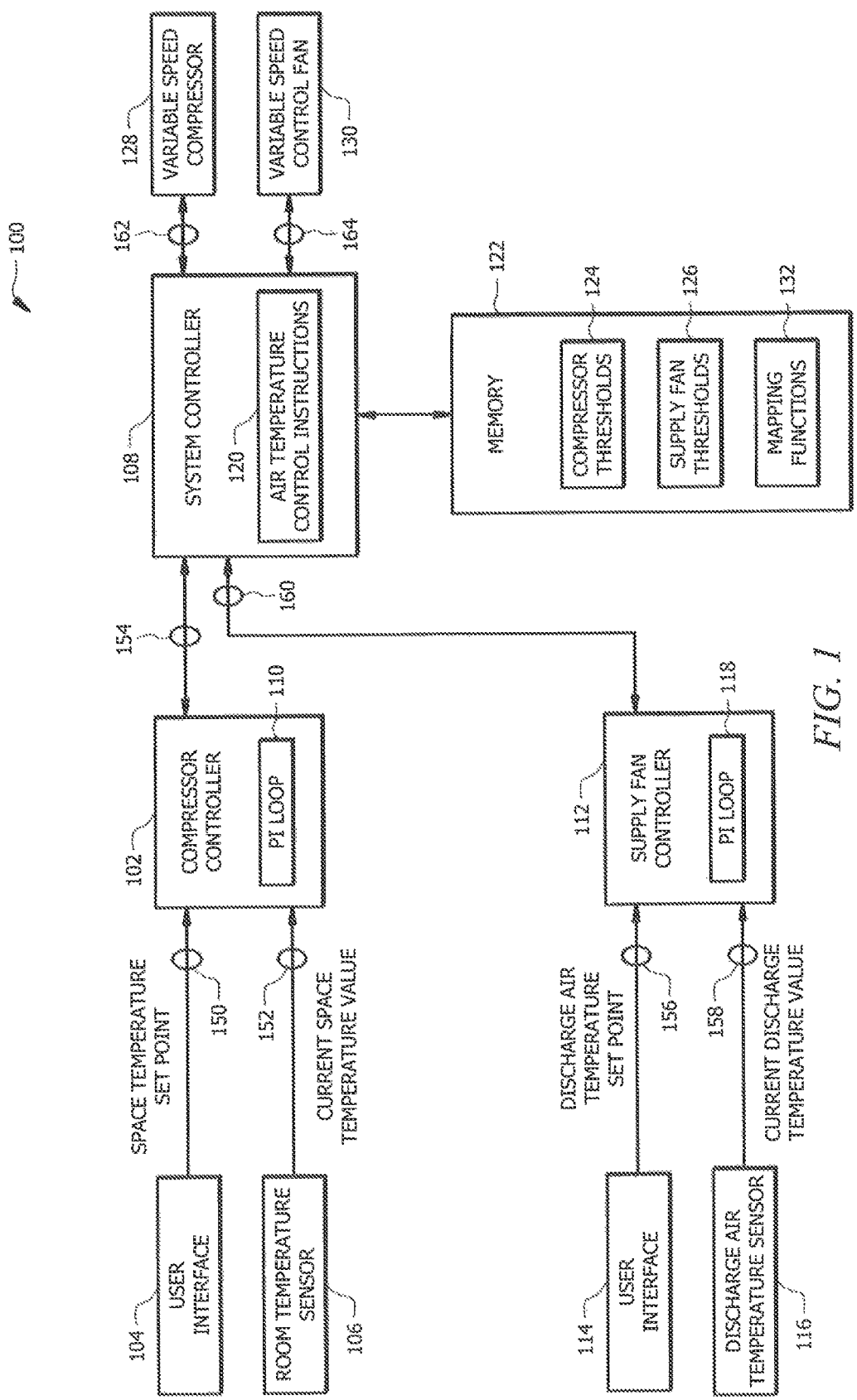
FIG. 1 is a schematic diagram of an embodiment of an HVAC system.

Disclosed herein are various embodiments for providing an HVAC system with improved space temperature and discharge air temperature control. The HVAC system is configured to use proportional-integral (PI) loops to determine a compressor speed and a supply fan speed and to operate the variable speed compressor and the variable speed supply fan at the determined speeds, respectively. The HVAC system is also configured to give priority to either the variable speed compressor or the variable speed supply fan when both the determined speeds cannot be achieved. A compressor plays a significant role in an HVAC system for controlling cooling capacity because a change in the speed of the compressor may result in a larger change in cooling capacity than a change to the speed of the variable speed supply fan. As a result, the controlling factors for the variable speed compressor are given priority over other controlling factors, which places an emphasis on controlling the space temperature. Using the space temperature delta (i.e. the difference between the space temperature set point and the current space temperature) the operating speed range of the variable speed compressor is reduced to better correspond with what is needed to cool a space while allowing the HVAC system to run more smoothly and efficiently.

The HVAC system is configured such that the variable speed compressor and the variable speed supply fan are independently controlled using separate PI loops. However, the PI loop for the variable speed compressor and the PI loop for the variable speed supply fan work together to achieve a desired space temperature and/or discharge air temperature. The PI loops are configured to use temperature set points and current temperature values to generate PI loop outputs for controlling the operating speed of the variable speed compressor and the variable speed supply fan. For example, a controller implementing the PI loop for the variable speed compressor is configured to generate a PI loop output that may be used to determine a compressor speed for the variable speed compressor. Similarly, a controller implementing the PI loop for the variable speed supply fan is configured to generate a PI loop output that may be used to determine a supply fan speed for the variable speed supply fan. When both the determined compressor speed and the supply fan speed cannot be satisfied, the HVAC system may give priority to either the variable speed compressor or the variable speed supply fan. In one embodiment, the HVAC system is configured to give priority to the variable speed compressor by operating the variable speed compressor at the determined compressor speed and operating the variable speed supply fan at a different speed than the determined supply fan speed. Alternatively, the HVAC system may be configured to give priority to the variable speed supply fan by operating the variable speed compressor at the determined supply fan speed and operating the variable speed compressor at a different speed than the determined compressor speed.

FIG. 1 is a schematic diagram of an embodiment of an HVAC system 100. In this embodiment, the HVAC system 100 may be employed in a commercial application such as rooftop commercial application. The HVAC system 100 comprises a compressor controller 102 in signal communication with and operably coupled to a user interface 104, a room temperature sensor 106, and a system controller 108.

An example of the user interface 104 includes, but is not limited to, a thermostat. The user interface 104 is configured to receive input from a user that indicates a space temperature set point and to output the space temperature set point 150 to the compressor controller 102. For example, the user interface 104 may comprise a graphical user interface (GUI) and/or one or more buttons that allows the user to indicate and set the space temperature set point 150.

The room temperature sensor 106 is configured to measure an air temperature for a room or space. For example, the room temperature sensor 106 may be a temperature sensor configured to determine the ambient temperature of the air in the space and to provide temperature data 152 (i.e. the current space temperature value) to the compressor controller 102. The room temperature sensor 106 may be located anywhere within a space. In one embodiment, the room temperature sensor 106 may be integrated with the user interface 104.

The compressor controller 102 may be implemented as one or more central processing unit (CPU) chips, logic units, cores (e.g. as a multi-core processor), field-programmable gate arrays (FPGAs), application specific integrated circuits (ASICs), or digital signal processors (DSPs). The compressor controller 102 is configured to process data and may be implemented in hardware or software. The compressor controller 102 comprises a PI loop 110 that is configured to receive the space temperature set point 150 and the current space temperature value 152 as determined by room temperature sensor 106, and to generate a PI loop output 154 that may be used to determine a compressor speed for the variable speed compressor 128. The PI loop output 154 may be transmitted to the system controller 108 via a wired or wireless electrical signal. Additional details for the PI loop 110 are described later in FIG. 2.

The HVAC system 100 further comprises a supply fan controller 112 in signal communication with and operably coupled to a user interface 114, a discharge air temperature sensor 116, and the system controller 108. The user interface 114 is configured to receive input from a user that indicates a discharge temperature set point and to output the discharge air temperature set point 156 to the supply fan controller 112. For example, the user interface 114 may comprise a GUI or one or more buttons that allows the user to indicate and set the discharge air temperature set point 156. The user interface 114 may be the same user interface as user interface 104 or may be a different user interface than user interface 104. Further, user interfaces 114 and 104 may be in the same location or may be in different locations.

An example of the discharge air temperature sensor 116 includes, but is not limited to, a 10K Negative Temperature Coefficient (NTC) sensor. The discharge air temperature sensor 116 is configured to measure a discharge or supply air temperature of the HVAC system 100. For example, the discharge air temperature sensor 116 may be a temperature sensor configured to determine the ambient temperature of air that is discharged from the HVAC system 100 and to provide temperature data 158 (i.e. the current discharge air temperature value) to the supply fan controller 112. The discharge air temperature sensor 116 may be positioned or located in a HVAC unit cabinet (not shown) or in any other location to measure the discharge air temperature of the HVAC system 100.

The supply fan controller 112 may be implemented as one or more CPU chips, logic units, cores (e.g. as a multi-core processor), FPGAs, ASICs, or DSPs. The supply fan controller 112 is configured to process data and may be implemented in hardware or software. The supply fan controller 112 comprises a PI loop 118 that is configured to receive the discharge air temperature set point 156 and the current discharge air temperature value 158 as determined by the discharge air temperature sensor 116, and to generate a PI loop output 160 that may be used to determine a supply fan speed for the variable speed supply fan 130. The PI loop output 160 may be transmitted to the system controller 108 via a wired or wireless electrical signal.

Additional details for the PI loop 118 are described later in FIG. 2.

The system controller 108 is operably coupled to the compressor controller 102, the supply fan controller 112, a memory 122, a variable speed compressor 128, and a variable speed supply fan 130. The system controller 108 may be implemented as one or more CPU chips, logic units, cores (e.g. as a multi-core processor), FPGAs, ASICs, or DSPs. The system controller 108 is configured to process data and may be implemented in hardware or software. The system controller 108 is configured to receive and transmit electrical signals. For example, the system controller 108 is configured to transmit control signals 162 and 164 to control or adjust the speed of the variable speed compressor 128 and the variable speed supply fan 130 based on the PI loop outputs 154 and 160, respectively. An example of a type of control signal that may be used to control the speed of the variable speed compressor 128 and the variable speed supply fan, includes but is not limited to, a pulse width modulated signal (PWM). The system controller 108 may be integrated with one or more other components (not necessarily shown) for processing the PI loop outputs and generating control signals as would be appreciated by one of ordinary skill in the art upon viewing this disclosure.

In FIG. 1, system controller 108 comprises air temperature control instructions 120 for the HVAC system 100. The air temperature control instructions 120 are instructions (e.g. software code or firmware) stored in the system controller 108. Alternatively, the air temperature control instructions 120 may be implemented as instructions stored in the memory 122. The inclusion of the air temperature control instructions 120 provides an improvement to the functionality of the HVAC system 100, which effects a transformation of the HVAC system 100 to a different state. The air temperature control instructions 120 are implemented by the system controller 108 to execute instructions for controlling the operating speed of a variable speed compressor 128 and a variable speed supply fan 130 to control the temperature of a room or space based on the space temperature set point, the current space temperature, the discharge air temperature set point, and the current discharge air temperature, respectively. For example, the air temperature control instructions 120 may be used to implement method 300 described in FIG. 3.

Although FIG. 1 illustrates the compressor controller 102, the supply fan controller 112, and the system controller 108 as separate controllers, it would be appreciated by one of ordinary skill in the art that the compressor controller 102, the supply fan controller 112, and the system controller 108 may be implemented using any suitable number of controllers that comprise PI loops 110 and 118.

The memory 122 may comprise one or more disks, tape drives, or solid-state drives and may be used as an over-flow data storage device, to store programs when such programs are selected for execution, and to store instructions and data that are read during program execution. Memory 122 may be volatile or non-volatile and may comprise read-only memory (ROM), random-access memory (RAM), ternary content-addressable memory (TCAM), dynamic random-access memory (DRAM), and static random-access memory (SRAM). Memory 122 may store compressor thresholds 124, supply fan thresholds 126, and mapping functions 132. Memory 122 may also store any other data as would be appreciated by one of ordinary skill in the art upon viewing this disclosure. The compressor thresholds 124 may be used to indicate upper threshold speeds and lower threshold speeds associated with compressor operation ranges for the variable speed compressor 128, and the supply fan thresholds 126 may be used to indicate upper threshold speeds and lower threshold speeds associated with supply fan operation ranges for the variable speed supply fan 130. Examples of using compressor thresholds 124 and supply fan thresholds 126 are described later in FIGS. 3-5. The compressor thresholds 124 and the supply fan thresholds 126 may be predetermined values set by an operator or an equipment manufacturer.

Examples of mapping functions 132 include, but are not limited to, equations and look-up tables. Mapping functions 132 may provide calculations between PI loop outputs, operating speeds (i.e. compressor speeds and supply fan speeds), and control signals for the variable speed compressor 128 and the variable speed supply fan 130. For example, the mapping functions 132 may be used to determine a compressor speed that corresponds with the output of PI loop 110 and to determine a control signal to transmit to the variable speed compressor 128 that corresponds with the determined compressor speed. The mapping functions 132 may also be used to determine a supply fan speed that corresponds with the output of PI loop 118 and to determine a control signal to transmit to the variable speed supply fan that corresponds with the determined supply fan speed.

The variable speed compressor 128 is operably coupled to the system controller 108. The system controller 108 may adjust the speed of the variable speed compressor 128 to control the space temperature. The variable speed compressor 128 may be configured to operate at 10%, 25%, 50%, 75%, 100%, or any other suitable percentage of the maximum speed of the variable speed compressor 128.

The variable speed supply fan 130 is operably coupled to the system controller 108. The system controller 108 may adjust the speed of the variable speed supply fan 130 to control the discharge air temperature of the HVAC system 100. The variable speed supply fan 130 may be configured to operate at 10%, 25%, 50%, 75%, 100%, or any other suitable percentage of the maximum speed of the variable speed supply fan 130.

Figure 2:
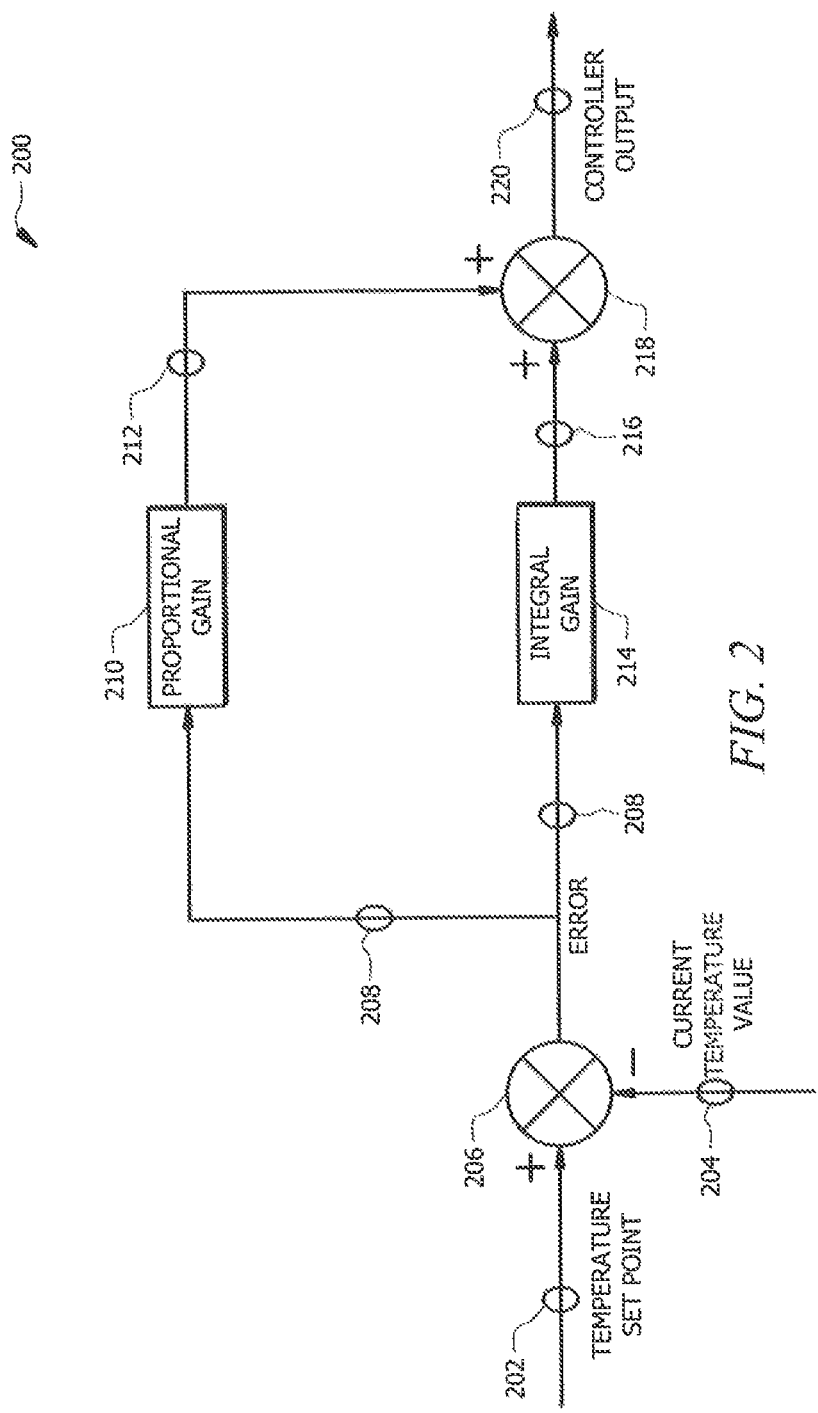
FIG. 2 is a schematic diagram of an embodiment of a PI loop for an HVAC system.

FIG. 2 is a schematic diagram of an embodiment of a PI loop 200 for an HVAC system 100 that may be used to implement PI loops 110 and 118. The PI loop 200 comprises a difference block 206, a proportional gain block 210, an integral gain block 214, and a summation block 218. The PI loop 200 is configured to receive a temperature set point 202 and a current temperature value 204 and to output a PI loop output 220 that may be used to determine a speed for the variable speed compressor 128 or the variable speed supply fan 130. The PI loop 200 may be configured as shown or in any other suitable configuration as would be appreciated by one of ordinary skill in the art upon viewing this disclosure. In an embodiment, the PI loop 200 may be configured to use one or more additional inputs such as inputs for an increased heat load or fresh air for ventilation.

In general, the PI loop 200 is configured to receive the temperature set point 202 (e.g. space temperature set point 150 or discharge air temperature set point 156) and the current temperature value 204 (e.g. current space temperature value 152 or current discharge air temperature value 158) at the difference block 206. The difference block 206 is configured to subtract the current temperature value 204 from the temperature set point 202 and to output an error or temperature difference 208 to the proportional gain block 210 and the integral gain block 214. The proportional gain block 210 is configured to receive the error 208, to apply (e.g. multiply) a proportional gain to the error 208, and to output a proportional error 212 to the summation block 218. The integral gain block 214 is configured to receive the error 208, to apply an integral gain to the error 208, and to output an integral action 216 to the summation block 218. The proportional gain value applied by the proportional gain block 210 and the integral gain value applied by the integral gain block 214 may be predetermined or adjustable and may be used to control how aggressively the PI loop 200 pursues or tracks the temperature set point 202. The proportional gain and the integral gain may be any suitable values as would be appreciated by one of ordinary skill in the art upon viewing this disclosure. The summation block 218 is configured to receive the proportional error 212 and the integral action 216, to combine (e.g. sum) the proportional error 212 and the integral action 216, and to output a PI loop output 220 (e.g. PI loop output 154 or 160) that may be used to determine the speed of the variable speed compressor or the speed of the variable speed supply fan. The PI loop output 220 may be used in a feedback loop (not shown) to track the temperature set point 202. For example, data from the PI loop output 220 may be fed back as a current temperature value to the input of the difference block 206. The PI loop output 220 may be used in conjunction with or in place of the current temperature value 204 input to the difference block 206.

In one embodiment, the PI loop 200 is configured as a PI loop 110 for the variable speed compressor 128. The PI loop 200 receives a space temperature set point 202 (e.g. space temperature set point 150) and a current space temperature value 204 (e.g. current space temperature value 152), for example, from a room temperature sensor 106 or thermostat. The PI loop 200 then subtracts the current space temperature value 204 from the space temperature set point 202 to calculate an error 208. The error 208 in this instance indicates the current space temperature delta. The PI loop 200 applies a proportional gain to the error 208 to calculate a proportional error 212 and applies an integral gain to the error 208 to calculate the integral action 216. The PI loop 200 combines the proportional error 212 and the integral action 216 to generate a PI loop output 220 (e.g. PI loop output 154) that may be used as feedback to update the current space temperature value 204. The PI loop 200 may repeat this process until the space temperature set point 202 and the current space temperature value 204 are substantially equal or within a predefined tolerance range (e.g. a predetermined dead band).

In another embodiment, the PI loop 200 is configured as a PI loop 118 for the variable speed supply fan 130. The PI loop 200 receives a discharge air temperature set point 202 (e.g. discharge air temperature set point 156) and a current discharge air temperature value 204 (e.g. current discharge air temperature value 158), for example, from a discharge air temperature sensor 116 in the supply air stream. The PI loop 200 then subtracts the current discharge air temperature value 204 from the discharge air temperature set point 202 to calculate an error 208. The error 208 in this instance indicates the current discharge air temperature delta. The PI loop 200 applies a proportional gain to the error 208 to calculate a proportional error 212 and applies an integral gain to the error 208 to calculate the integral action 216. The PI loop 200 combines the proportional error 212 and the integral action 216 to generate a PI loop output 220 (e.g. PI loop output 160) that may be used as feedback to update the current discharge air temperature value 204. The PI loop 200 may repeat this process until the discharge air temperature set point 202 and the current discharge air temperature value 204 are substantially equal or within a predefined tolerance range.

Figure 3:
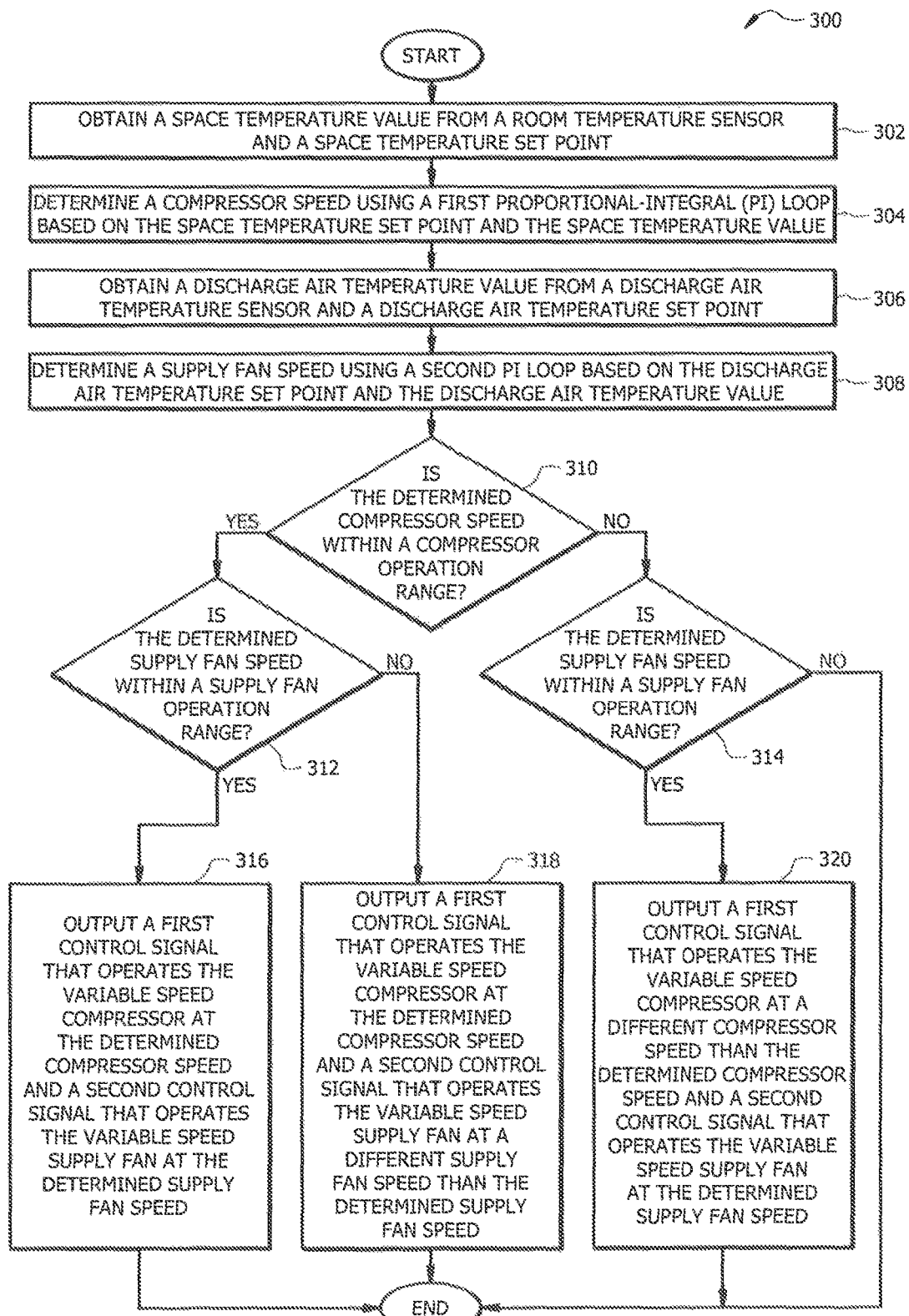
FIG. 3 is a flowchart of an embodiment of a temperature control method.

FIG. 3 is a flowchart of an embodiment of a temperature control method 300 for an HVAC system 100. Method 300 may be implemented by one or more controllers, for example, compressor controller 102, supply fan controller 112, and/or system controller 108 to control the operating speed of a variable speed compressor 128 and a variable speed supply fan 130 to control the temperature of a room or space.

At step 302, the controller obtains a current space temperature value 152 from a room temperature sensor 106 and a space temperature set point 150 from user interface 104. For example, a user may set the space temperature set point using the user interface 104 and the user interface 104 may communicate the space temperature set point 150 to the controller. The room temperature sensor 106 may measure the current space temperature and communicate a current space temperature value 152 to the controller. At step 304, the controller determines a compressor speed using the first PI loop 110 based on a delta between the space temperature set point 150 and the current space temperature value 152. The first PI loop 110 uses the space temperature set point 150 and the current space temperature value 152 to generate a first PI loop 154 output that may be used to determine a compressor speed for the variable speed compressor 128 similarly to as described in FIG. 2. In one embodiment, the controller may use a mapping function 132 to determine a compressor speed that corresponds with the first PI loop output 154.

At step 306, the controller obtains a current discharge air temperature value 158 from a discharge air temperature sensor 116 and a discharge air temperature set point 156 from user interface 114. For example, a user may set the discharge air temperature set point using user interface 114 and the user interface 114 may communicate the discharge air temperature set point 156 to the controller. The discharge air temperature sensor 116 may measure the current discharge air temperature and communicate a current discharge air temperature value 158 to the controller. At step 308, the controller determines a supply fan speed using the second PI loop 118 based on a delta between the discharge air temperature set point 156 and the current discharge air temperature value 158. The second PI loop 118 uses the discharge air temperature set point 156 and the current discharge air temperature value 158 to generate a second PI loop 160 output that may be used to determine a supply fan speed for the variable speed supply fan 130 similarly to as described in FIG. 2. In one embodiment, the controller may use a mapping function 132 to determine a supply fan speed that corresponds with the second PI loop output 160.

At step 310, the controller determines whether the compressor speed is within a compressor operation range. The controller may use the compressor thresholds 124 to determine whether the compressor speed is within a compressor operation range. The compressor thresholds 124 may indicate a maximum operating speed (e.g. an upper threshold speed) and a minimum operating speed (e.g. a lower threshold speed) that the variable speed compressor 128 can operate at. The controller may compare the determined compressor speed to the maximum operating speed and the minimum operating speed and may determine that the compressor speed is within the compressor operation range when the compressor speed is between the maximum operating speed and the minimum operating speed of the variable speed compressor 128. The controller may determine that the compressor speed is not within the compressor operation range when the compressor speed is greater than the maximum operating speed or less than the minimum operating speed. The controller proceeds to step 312 when the compressor speed is within a compressor operation range. Otherwise, the controller proceeds to step 314, when the compressor speed is not within a compressor operation range.

At step 312, the controller determines whether the supply fan speed is within a supply fan operation range. The controller may use the supply fan thresholds 126 to determine whether the supply fan speed is within a supply fan operation range. The supply fan thresholds 126 may be used to indicate a maximum operating speed and a minimum operating speed that the variable speed supply fan 130 can operate at. The controller may compare the determined supply fan speed to the maximum operating speed (e.g. an upper threshold speed) and the minimum operating speed (e.g. a lower threshold speed) and may determine that the compressor speed is within the supply fan operating range when the supply fan speed is between the maximum operating speed and the minimum operating speed of the variable speed supply fan 130. The controller may determine that the supply fan speed is not within the supply fan operation range when then supply fan speed is greater than the maximum operating speed or less than the minimum operating speed. The controller proceeds to step 316 when the supply fan speed is within a supply fan operation range. Otherwise, the controller proceeds to step 318, when the supply fan speed is not within a supply fan operation range.

At step 316, the controller transmits a first control signal 162 to the variable speed compressor 128 that indicates to operate the variable speed compressor 128 at the determined compressor speed and a second control signal 164 to the variable speed supply fan 130 that indicates to operate the variable speed supply fan 130 at the determined supply fan speed when the determined compressor speed is within the compressor operation range and the determined supply fan speed is within the supply fan operation range. In one embodiment, the controller may use a mapping function 132 to determine the first control signal 162 to transmit to the variable speed compressor 128 and the second control signal 164 to transmit to the variable speed supply fan 130.

Returning to step 312, the controller proceeds to step 318 when the controller determines that the supply fan speed is not within a supply fan operation range. At step 318, the controller transmits a first control signal 162 to the variable speed compressor 128 that indicates to operate the variable speed compressor 128 at the determined compressor speed and a second control signal 164 to the variable speed supply fan 130 that indicates to operate the variable speed supply fan 130 at a different supply fan speed than the determined supply fan speed when the determined compressor speed is within the compressor operation range and the determined supply fan speed is not within the supply fan operation range. When the determined supply fan speed is greater than an upper threshold speed value, the controller may transmit a second control signal 164 that indicates to operate the variable speed supply fan 130 at speed that is less than or equal to the upper threshold speed value. An example of this scenario is described in FIG. 4. When the determined supply fan speed is less than a lower threshold speed value, the controller may transmit a second control signal 164 that indicates to operate the variable speed supply fan 130 at speed that is greater than or equal to the lower threshold speed value. An example of this scenario is described in FIG. 5. In step 318, the controller gives priority to the variable speed compressor 128 temperature by operating the variable compressor 128 at the determined compressor speed and operating the variable speed supply fan 130 at a different supply fan speed than the determined supply fan speed when both the determined compressor speed and the determined supply fan speed cannot be satisfied.

Returning to step 310, the controller proceeds to step 314, when the compressor speed is not within a compressor operation range. At step 314, the controller determines whether the supply fan speed is within a supply fan operation range. Step 314 may be performed similarly to as described in step 312. The controller proceeds to step 320 when the supply fan speed is within a supply fan operation range. Otherwise, the controller may terminate method 300 when the supply fan speed is not within a supply fan operation range.

At step 320, the controller transmits a first control signal 162 to the variable speed compressor 128 that indicates to operate the variable speed compressor 128 at a different compressor speed than the determined compressor speed and a second control signal 164 to the variable speed supply fan 130 that indicates to operate the variable speed supply fan 130 at the determined supply fan speed when the determined compressor speed is not within the compressor operation range and the determined supply fan speed is within the supply fan operation range. When the determined compressor speed is greater than an upper threshold speed value, the controller may transmit a first control signal 162 that indicates to operate the variable speed compressor 128 at speed that is less than or equal to the upper threshold speed value. When the determined compressor speed is less than a lower threshold speed value, the controller may transmit a first control signal 162 that indicates to operate the variable speed compressor 128 at speed that is greater than or equal to the lower threshold speed value and a second control signal that indicates to operate the variable speed supply fan 130 at the determined supply fan speed. In step 320, the controller gives priority to the variable speed supply fan 130 temperature by operating the variable supply fan 130 at the determined supply fan speed and operating the variable speed compressor 128 at a different compressor speed than the determined compressor speed when both the determined compressor speed and the determined supply fan speed cannot be satisfied.

FIG. 4 is a table 400 of an embodiment of a controller employing the temperature control method 300 when both the determined compressor speed and the determined supply fan speed cannot be satisfied. In particular, table 400 is used to illustrate an example of how priority may be given to the variable speed compressor 128 when the determined compressor speed can be achieved, but the determined supply fan speed is greater than an upper threshold speed value of the supply fan operation range. Table 400 is provided for illustrative purposes only and is generated based on operating parameters of an HVAC system 100, which indicate that a compressor speed range (i.e. compressor operation range) is between about 22 Hertz (Hz) to about 67 Hz, a supply fan speed range (i.e. supply fan operation range) is between about 450 cubic feet per minute (CFM) to about 2,500 CFM, and a discharge air temperature range is between about 45° F. and about 65° F. The operating parameters of the HVAC system 100 may be predetermined based on the various components (e.g. the variable speed compressor 128 and the variable speed supply fan 130) of the HVAC system 100. In table 400, the discharge air temperature range is shown as column 402, a portion of the compressor speed range is shown as columns 404, and the supply fan speed range is shown as rows 406.

As an example, the first PI loop 110 may generate a PI loop output that corresponds with a compressor speed of 55 Hz (shown as column 408) based on the delta between the space temperature set point and the current space temperature. A user may set the discharge air temperature set point to 62° F. (shown as row 410) which causes the second PI loop 118 to generate a PI loop output that corresponds with a supply fan speed of 3,032 CFM. The determined supply fan speed is greater than an upper threshold speed value (i.e. 2,465 CFM) of the supply fan speed range 406 and, therefore, both the determined compressor speed and the determined supply fan speed cannot be satisfied.

In this example, the controller is configured to give priority to the variable speed compressor 128 over the variable speed supply fan 130 to control the space temperature when both the determined compressor speed and the determined supply fan speed cannot be satisfied. Giving priority to the variable speed controller 128 allows the variable speed compressor 128 to operate at the determined compressor speed which may reduce or avoid over ramping the initial speed of the variable speed compressor. The controller sends a first control signal that indicates to operate the variable speed compressor 128 at the determined compressor speed (i.e. 55 Hz) and a second control signal that indicates to operate the variable speed supply fan 130 at the upper threshold speed value (i.e. 2,465 CFM). Operating the supply fan at the upper threshold speed value reduces the discharge air temperature to 60° F. (shown as row 412). As a result, the variable speed compressor 128 will operate at the determined compressor speed to achieve the space temperature set point at the expense of a discharge air temperature that is less than the discharge air temperature set point.

FIG. 5 is a table 500 of another embodiment of a controller employing the temperature control method 300 when both the determined compressor speed and the determined supply fan speed cannot be satisfied. In particular, table 500 is used to illustrate an example of how priority may be given to the variable speed compressor 128 when the determined compressor speed can be achieved, but the determined supply fan speed is less than a lower threshold speed value of the supply fan operation range. Table 500 is generated based on operating parameters of an HVAC system 100, which may be the same operating parameters as described with respect to table 400 in FIG. 4. In table 500, the discharge air temperature range is shown as column 502, a portion of the compressor speed range is shown as columns 504, and the supply fan speed range is shown as rows 506.

As an example, the first PI loop 110 may generate a PI loop output that corresponds with a compressor speed of 26 Hz (shown as column 508) based on the delta between the space temperature set point and the current space temperature. A user may set the discharge air temperature set point to 48° F. (shown as row 510) which causes the second PI loop 118 to generate a PI loop output that corresponds with a supply fan speed of 339 CFM. The determined supply fan speed is less than a lower threshold speed value (i.e. 454 CFM) of the supply fan speed range 506 and, therefore, both the determined compressor speed and the determined supply fan speed cannot be satisfied.

In this example, the controller is configured to give priority to the variable speed compressor 128 over the variable speed supply fan 130 to control the space temperature when both the determined compressor speed and the determined supply fan speed cannot be satisfied. Giving priority to the variable speed controller 128 allows the variable speed compressor 128 to operate at the determined compressor speed which may reduce or avoid over ramping the initial speed of the variable speed compressor. The controller sends a first control signal that indicates to operate the variable speed compressor 128 at the determined compressor speed (i.e. 26 Hz) and a second control signal that indicates to operate the variable speed supply fan 130 at the lower threshold speed value (i.e., 454 CFM). Operating the supply fan at the lower threshold speed value increases the discharge air temperature to 51° F. (shown as row 512). As a result, the variable speed compressor 128 will operate at the determined compressor speed to achieve the space temperature set point at the expense of a discharge air temperature that is greater than the discharge air temperature set point.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A temperature control system comprising:
   a variable speed compressor;
   a variable speed supply fan;
   a room temperature sensor configured to measure a space temperature value;
   a discharge air temperature sensor configured to measure a discharge air temperature value;
   a compressor controller operably coupled to the room temperature sensor, and configured to:
     receive a space temperature set point;
     receive the measured space temperature value;
     determine a compressor speed based on a delta between the space temperature set point and the measured space temperature value using a first proportional-integral (PI) loop; and
     output the determined compressor speed;
   a supply fan controller operably coupled to the discharge air temperature sensor, and configured to:
     receive a discharge air temperature set point;
     receive the measured discharge air temperature value;
     determine a supply fan speed based on a delta between the discharge air temperature set point and the measured discharge air temperature value using a second PI loop; and
     output the determined supply fan speed; and
   a system controller operably coupled to the variable speed compressor, the variable speed supply fan, the compressor controller, and the supply fan controller, and configured to:
     receive the determined compressor speed and the determined supply fan speed;
     determine whether the determined compressor speed is within a compressor operation range in a mapping table, wherein the mapping table identifies:
       the compressor operation range identifying a set of compressor speeds; and
       supply fan operation ranges linked with each compressor speed in the compressor operation range, wherein the supply fan operation range varies based on the compressor speed;
     determine whether the determined supply fan speed is within the supply fan operation range linked with the determined compressor speed; and
     output a first control signal that controls the speed of the variable speed compressor based on the determination of whether the compressor speed is within the compressor operation range; and
     output a second control signal that controls the speed of the variable speed supply fan based on the determination of whether the supply fan speed is within the supply fan operation range.

2. The system of claim 1, wherein the system controller is configured to:
   determine that the determined compressor speed is within the compressor operation range;
   output the first control signal to operate the variable speed compressor at the determined compressor speed in response to determining that the determined compressor speed is within the compressor operation range;
   determine that the determined supply fan speed is less than a lower threshold speed value for the supply fan operation range; and
   output the second control signal to operate the variable speed supply fan at the lower threshold speed value in response to determining that the determined supply fan speed is less than the lower threshold speed value for the supply fan operation range and determining that the determined compressor speed is within the compressor operation range.

3. The system of claim 1, wherein the system controller is configured to:
   determine that the determined compressor speed is within the compressor operation range;
   output the first control signal to operate the variable speed compressor at the determined compressor speed in response to determining that the determined compressor speed is within the compressor operation range;
   determine that the determined supply fan speed is greater than an upper threshold speed value for the supply fan operation range; and
   output the second control signal to operate the variable speed supply fan at the upper threshold speed value in response to determining that the determined supply fan speed is greater than the upper threshold speed value for the supply fan operation range and determining that the determined compressor speed is within the compressor operation range.

4. The system of claim 1, wherein the system controller is configured to:
   determine that the determined compressor speed is less than a lower threshold speed value for the compressor operation range;
   output the first control signal to operate the variable speed compressor at the lower threshold speed value in response to determining that the determined compressor speed is less than the lower threshold speed value for the compressor operation range;
   determine that the determined supply fan speed is within the supply fan operation range; and
   output the second control signal to operate the variable speed supply fan at the determined supply fan speed in response to determining that the determined supply fan speed is within the supply fan operation range.

5. The system of claim 1, wherein the system controller is configured to:
   determine that the determined compressor speed is greater than an upper threshold speed value for the compressor operation range; and
   output the first control signal to operate the variable speed compressor at the upper threshold speed value in response to determining that the determined compressor speed is greater than the upper threshold speed value for the compressor operation range;
   determine that the determined supply fan speed is within the supply fan operation range; and
   output the second control signal to operate the variable speed supply fan at the determined supply fan speed in response to determining that the determined supply fan speed is within the supply fan operation range.

6. The system of claim 1, wherein the system controller is configured to:
- determine that the determined compressor speed is within the compressor operation range;
- output the first control signal to operate the variable speed compressor at the determined compressor speed in response to determining that the determined compressor speed is within the compressor operation range;
- determine that the determined supply fan speed is within the supply fan operation range; and
- output the second control signal to operate the variable speed supply fan at the determined supply fan speed in response to determining that the determined supply fan speed is within the supply fan operation range.

7. A temperature control method comprising:
- obtaining, by a controller, a measured space temperature value from a room temperature sensor and a space temperature set point;
- determining, by the controller, a compressor speed using a first proportional-integral (PI) loop based on a delta between the space temperature set point and the measured space temperature value;
- obtaining, by the controller, a measured discharge air temperature value from a discharge air temperature sensor and a discharge air temperature set point;
- determining, by the controller, a supply fan speed using a second PI loop based on a delta between the discharge air temperature set point and the measured discharge air temperature value;
- determining, by the controller, whether the determined compressor speed is within a compressor operation range in a mapping table, wherein the mapping table identifies:
  - the compressor operation range identifying a set of compressor speeds; and
  - supply fan operation ranges linked with each compressor speed in the compressor operation range, wherein the supply fan operation range varies based on the compressor speed;
- determining, by the controller, whether the determined supply fan speed is within the supply fan operation range linked with the determined compressor speed; and
- outputting, by the controller, a first control signal that controls the speed of a variable speed compressor based on the determination of whether the compressor speed is within the compressor operation range; and
- outputting, by the controller, a second control signal to control the speed of a variable speed supply fan based on the determination of whether the supply fan speed is within the supply fan operation range.

8. The method of claim 7, further comprising:
- determining, by the controller, that the determined compressor speed is within the compressor operation range;
- outputting, by the controller, the first control signal to operate the variable speed compressor at the determined compressor speed in response to determining that the determined compressor speed is within the compressor operation range;
- determining, by the controller, that the determined supply fan speed is less than a lower threshold speed value for the supply fan operation range; and
- outputting, by the controller, the second control signal to operate the variable speed supply fan at the lower threshold speed value in response to determining that the determined supply fan speed is less than the lower threshold speed value for the supply fan operation range and determining that the determined compressor speed is within the compressor operation range.

9. The method of claim 7, further comprising:
- determining, by the controller, that the determined compressor speed is within the compressor operation range;
- outputting, by the controller, the first control signal to operate the variable speed compressor at the determined compressor speed in response to determining that the determined compressor speed is within the compressor operation range;
- determining, by the controller, that the determined supply fan speed is greater than an upper threshold speed value for the supply fan operation range; and
- outputting, by the controller, the second control signal to operate the variable speed supply fan at the upper threshold speed value in response to determining that the determined supply fan speed is greater than the upper threshold speed value for the supply fan operation range and determining that the determined compressor speed is within the compressor operation range.

10. The method of claim 7, further comprising:
- determining, by the controller, that the determined compressor speed is less than a lower threshold speed value for the compressor operation range; and
- outputting, by the controller, the first control signal to operate the variable speed compressor at the lower threshold speed value in response to determining that the determined compressor speed is less than the lower threshold speed value for the compressor operation range;
- determining, by the controller, that the determined supply fan speed is within the supply fan operation range; and
- outputting, by the controller, the second control signal to operate the variable speed supply fan at the determined supply fan speed in response to determining that the determined supply fan speed is within the supply fan operation range.

11. The method of claim 7, further comprising:
- determining, by the controller, that the determined compressor speed is greater than an upper threshold speed value for the compressor operation range; and
- outputting, by the controller, the first control signal to operate the variable speed compressor at the upper threshold speed value in response to determining that the determined compressor speed is greater than the upper threshold speed value for the compressor operation range;
- determining, by the controller, that the determined supply fan speed is within the supply fan operation range; and
- outputting, by the controller, the second control signal to operate the variable speed supply fan at the determined supply fan speed in response to determining that the determined supply fan speed is within the supply fan operation range.

12. The method of claim 7, further comprising:
- determining, by the controller, that the determined compressor speed is within the compressor operation range;
- outputting, by the controller, the first control signal to operate the variable speed compressor at the determined compressor speed in response to determining that the determined compressor speed is within the compressor operation range;
- determining, by the controller, that the determined supply fan speed is within the supply fan operation range; and
- outputting, by the controller, the second control signal to operate the variable speed supply fan at the determined supply fan speed in response to determining that the determined supply fan speed is within the supply fan operation range.

13. An apparatus comprising:
a memory operable to store:
   a mapping table identifying:
      a compressor operation range identifying a set of compressor speed; and
      supply fan operation ranges linked with each compressor speed in the compressor operation range, wherein the supply fan operation range varies based on the compressor speed; and
a controller operably coupled to the memory, and configured to:
   obtain a measured space temperature value from a room temperature sensor and a space temperature set point;
   determine a compressor speed using a first proportional-integral (PI) loop based on a delta between the space temperature set point and the measured space temperature value;
   obtain a measured discharge air temperature value from a discharge air temperature sensor and a discharge air temperature set point;
   determine a supply fan speed using a second PI loop based on a delta between the discharge air temperature set point and the measured discharge air temperature value;
   determine whether the determined compressor speed is within the compressor operation range;
   determine whether the determined supply fan speed is within the supply fan operation range linked with the determined compressor speed; and
   output a first control signal that controls the speed of a variable speed compressor based on the determination of whether the compressor speed is within the compressor operation range; and
   output a second control signal to control the speed of a variable speed supply fan based on the determination of whether the supply fan speed is within the supply fan operation range.

14. The apparatus of claim 13, wherein the controller is configured to:
   determine that the determined compressor speed is within the compressor operation range;
   output the first control signal to operate the variable speed compressor at the determined compressor speed in response to determining that the determined compressor speed is within the compressor operation range;
   determine that the determined supply fan speed is less than a lower threshold speed value for the supply fan operation range; and
   output the second control signal to operate the variable speed supply fan at the lower threshold speed value in response to determining that the determined supply fan speed is less than the lower threshold speed value for the supply fan operation range and determining that the determined compressor speed is within the compressor operation range.

15. The apparatus of claim 13, wherein the controller is configured to:
   determine that the determined compressor speed is within the compressor operation range;
   output the first control signal to operate the variable speed compressor at the determined compressor speed in response to determining that the determined compressor speed is within the compressor operation range;
   determine that the determined supply fan speed is greater than an upper threshold speed value for the supply fan operation range; and
   output the second control signal to operate the variable speed supply fan at the upper threshold speed value in response to determining that the determined supply fan speed is greater than the upper threshold speed value for the supply fan operation range and determining that the determined compressor speed is within the compressor operation range.

16. The apparatus of claim 13, wherein the controller is configured to:
   determine that the determined compressor speed is less than a lower threshold speed value for the compressor operation range; and
   output the first control signal to operate the variable speed compressor at the lower threshold speed value in response to determining that the determined compressor speed is less than the lower threshold speed value for the compressor operation range;
   determine that the determined supply fan speed is within the supply fan operation range; and
   output the second control signal to operate the variable speed supply fan at the determined supply fan speed in response to determining that the determined supply fan speed is within the supply fan operation range.

17. The apparatus of claim 13, wherein the controller is configured to:
   determine that the determined compressor speed is greater than an upper threshold speed value for the compressor operation range; and
   output the first control signal to operate the variable speed compressor at the upper threshold speed value in response to determining that the determined compressor speed is greater than the upper threshold speed value for the compressor operation range;
   determine that the determined supply fan speed is within the supply fan operation range; and
   output the second control signal to operate the variable speed supply fan at the determined supply fan speed in response to determining that the determined supply fan speed is within the supply fan operation range.

18. The apparatus of claim 13, wherein the controller is configured to:
   determine that the determined compressor speed is within the compressor operation range;
   output the first control signal to operate the variable speed compressor at the determined compressor speed in response to determining that the determined compressor speed is within the compressor operation range;
   determine that the determined supply fan speed is within the supply fan operation range; and
   output the second control signal to operate the variable speed supply fan at the determined supply fan speed in response to determining that the determined supply fan speed is within the supply fan operation range.

* * * * *